April 20, 1954     M. A. PASIN     2,676,054
JUVENILE COASTER WAGON BODY PANELING
Filed Sept. 19, 1950     2 Sheets-Sheet 1
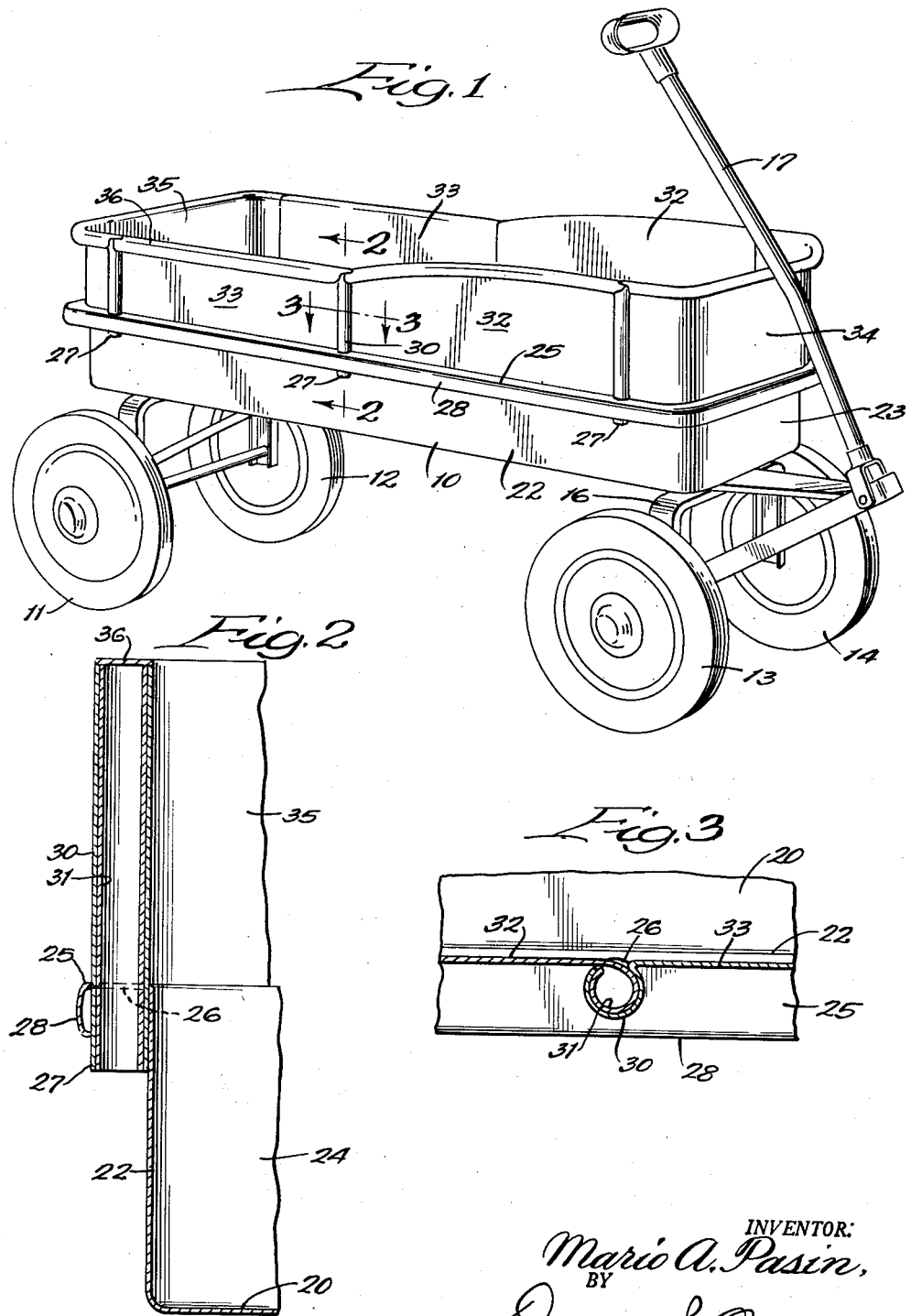

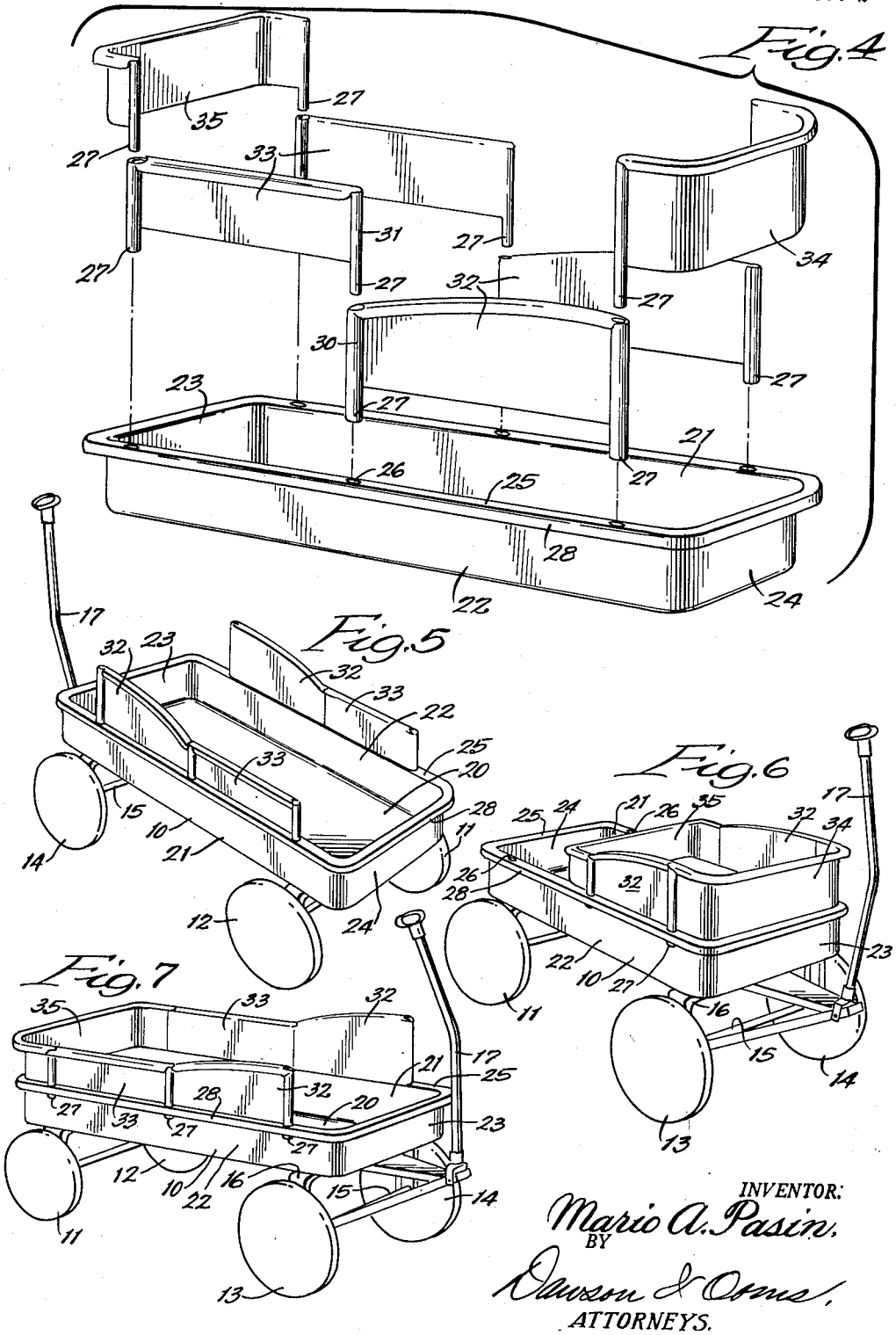

Patented Apr. 20, 1954

2,676,054

UNITED STATES PATENT OFFICE 2,676,054

JUVENILE COASTER WAGON BODY PANELING

Mario A. Pasin, Oak Park, Ill., assignor to Radio Steel & Mfg. Co., Chicago, Ill., a corporation of Illinois Application September 19, 1950, Serial No. 185,594

6 Claims. (Cl. 296—32)

This invention relates to coaster wagons and especially to the body construction of a juvenile coaster wagon.

It is an object of this invention to produce a coaster wagon of the type described which may be selectively modified to increase the height and arrangement of the side wall paneling and it is a related object to produce a coaster wagon wherein the side wall paneling may be simply and easily adjusted to provide various arrangements for adapting the wagon to particular uses.

Another object is to produce a juvenile wagon wherein the permanent body portion may be supplemented with auxiliary side wall panels that can be easily and quickly placed in position of use to give a sturdy structure that is substantially free of projecting edges or other parts which might prove dangerous to a child.

A further object is to produce for use in a juvenile wagon, a plurality of interfitting side panel sections which may be positioned in various arrangements in an assembled relation on the wagon body.

These and other objects and advantages of this invention will hereinafter appear and for purposes of illustration, but not of limitation, an embodiment is shown in the accompanying drawings in which—

Figure 1 is a perspective view of a juvenile wagon embodying the features of this invention;

Figure 2 is a sectional elevational view taken along the line 2—2 of Figure 1;

Figure 3 is a sectional view taken along the line 3—3 of Figure 1;

Figure 4 is a perspective view of the wagon body indicating the order in which the side panel sections should be placed or removed from their assembled relation in accordance with their height in the drawing;

Figure 5 is a perspective view showing one arrangement which may be achieved by the paneling;

Figure 6 is a perspective view which shows a further arrangement, and

Figure 7 is a perspective view of the wagon showing a still further arrangement.

In accordance with this invention there are provided a plurality of side wall panel sections having interfitting portions on the ends thereof in the form of tubular members which telescope one into the other to establish a firm connected relation. The tubular members are adapted to project downwardly beyond the associated side wall panels for insertion through suitable openings in the permanent side wall of the wagon body for the purpose of anchoring the panel sections onto the wagon body in the assembled relation. The side wall panel sections are capable of various arrangements to achieve certain desirable characteristics and the interfitting members on the ends of the panel sections are selectively arranged to provide for a predetermined order of assembling or disassembling the parts.

Referring to the drawing, 10 indicates the body of the juvenile coaster wagon mounted on a pair of laterally spaced rear wheels 11 and 12 and a pair of laterally spaced front wheels 13 and 14. The front wheels are rotatably mounted on an axle 15 carried by a cross member 16 pivoted from the underside of the wagon body for steering movement by a handle 17.

The wagon body may be formed of sheet metal or the like rigid material. It has the usual bottom wall 20, side walls 21 and 22 and end walls 23 and 24. The wagon body may be stamped from a single sheet of metal or formed of several parts connected together as by riveting, bolting or the like. The permanent side and end wall members are provided with an outwardly extending flange 25 all around the upper edge with spaced openings 26 therein for receiving posts 27 projecting from the side wall panel sections, which will hereinafter be described in greater detail. The flanged portion 25 is formed with a down-turned curvilinear rim or apron 28 to eliminate sharp edges which might have harmful bearing on its use by a child and to improve the strength and the streamlined appearance of the wagon.

In accordance with this invention, a number of interfitting side wall panel sections of metal or the like are provided for building up the side wall structure and to give desired arrangements which adapt the wagon better for particular uses. These side wall panel sections are adapted to be arranged in end to end relation with interfitting members at their ends to establish desired connection. The interfitting members preferably comprise end portions which are turned to form substantially complete tubular members 30 and 31—the dimension of one tubular section 30 being larger than the adjacent tubular section 31 of the panel to be positioned in end relation thereto thereby to enable telescoping of the smaller into the larger substantially throughout their lengths, as indicated in Figures 2 and 3. These tubular sections are formed to be of greater length than the side wall panel sections so as to extend as posts 27 below the edge thereof for insertion through properly spaced openings 26 in the permanent side and end wall members of the wagon body, when establishing the assembled relation.

More specifically, as shown in the drawings, the auxiliary interconnecting panel sections are preferably six in number. These are divided into a pair of substantially straight side wall members 32 and 33 while the others are substantially U-shaped to comprise the front and rear end walls 34 and 35 having ends that extend in parallel relation with the side walls and interfit therewith.

Each of the auxiliary side wall panel sections is formed with a curvilinear bead 36 about the top edge to eliminate sharp edges and to increase the strength of the panel sections as well as to improve the appearance. The beaded portion extends beyond the panel section and overlaps the tubular members 31 of smaller dimension so as completely to seal off access to the telescoping parts and thereby to minimize further possible dangers.

In order to make certain that the panel sections be assembled or disassembled in a predetermined order and in order to permit a number of useful arrangements, the tubular members on each end of the panel sections 32 are formed to be of larger dimension while the tubular elements on the end panels 34 and 35 are each designed to be of smaller dimension. The tubular members on the ends of panel sections 33 are large at one end to receive the tubular sections of the end panel sections in telescoping arrangement and small at the other end in order to permit telescoping in the tubular member 30 of larger dimension on the end of panel section 32.

It will be apparent from the description and from the arrangement of tubular members on the ends of the panel sections that panel sections 32 invariably are the first to be inserted in the assembled relation on the wagon body and the last to be removed. Positioning of the panel sections 32 is achieved by inserting the posts 27 into the corresponding forward pair of openings in the side walls 21 and 22. Thereafter the tubular members 31 on the ends of panel sections 33 may be telescoped into the tubular members 30 and the panel sections actuated downwardly until the rearward posts of the tubular members 31 become seated in the rearward openings 26 of the wagon body. In this arrangement, shown in Figure 5, the side wall panel sections 32 and 33 are firmly positioned on the wagon body which may be used for carrying parcels of relatively long dimensions, such as logs or the like.

Instead of inserting panel sections 33, end panel section 35 may be positioned rearwardly of the section 32 by telescoping the tubular members 31 on the ends thereof into the rearward tubular members 30 of panel sections 32. Independent thereof front panel section 34 may be similarly positioned by telescoping the tubular members 31 on the ends thereof into the forward tubular members 30 of panel section 32. This arrangement, shown in Figure 6, is adapted for use of the wagon in the transportation of a child which needs more confining space.

A still further modification may be achieved by effecting the assembly as described in connection with Figure 5 including the subsequent insertion of the tubular members 31 in the tubular members 30 on the rearward end of the panel sections 33. This arrangement, shown in Figure 7, is suitable for a number of uses, such as in the carting of package and the like.

It will be apparent from the description that I have provided a new and improved paneling arrangement which may be used to increase the wall section of the juvenile wagon body to provide a number of additional uses without impairing the attractiveness or the safety of the wagon. It will be apparent also that the panel sections are dimensioned and contoured to correspond substantially to the streamline and shape of the wagon body so as to appear as a part thereof and to function as a part thereof when in the assembled relation.

It will be understood that numerous changes may be made in the details of construction, arrangement and operation without departing from the spirit of the invention, especially as defined in the following claims.

I claim:

1. In a juvenile wagon including vertically disposed side walls having flanges extending from the upper edge portions thereof with openings therein, side wall panel sections adapted to be positioned in extension of the side walls of the wagon body, tubular members on the ends of said side wall panel sections, the tubular member having an elongate slot extending lengthwise therethrough and being dimensioned to have an opening larger than the tubular member on the end of the panel section adapted to be positioned in end to end relation with the first whereby in the assembled relation the tubular member of smaller dimension telescopes within the larger with its adjacent side wall portion passing through the slot, at least one of said tubular sections extending below the side wall panels to project together through the openings in the side walls of the wagon body.

2. In a juvenile wagon as claimed in claim 1 in which the upper end portions of the panel sections are turned outwardly to form a curvilinear bead which reinforces the panel sections and to provide for safety and appearance.

3. In a juvenile wagon as claimed in claim 2 in which the beaded portion extends over the tubular members of smaller dimension adapted to be inserted in tubular members of larger dimension for establishing the interfitting relation for the purpose of imparting continuity and concealing the interfitting parts.

4. In a juvenile wagon as claimed in claim 1 in which the panel sections comprise a pair of front side wall panels, a pair of rear side wall panels, a U-shaped front panel and a U-shaped rear panel.

5. In a juvenile wagon as claimed in claim 4 in which the tubular members on the ends of the front side panels are each of larger dimension for receiving other tubular elements in telescoping relation and the tubular members on the ends of the front and rear wall panels are each of smaller dimension for telescoping into tubular members of larger dimension and in which the rear side wall panels have tubular members of large dimension at one end and small dimension at the other.

6. In a juvenile wagon having a body portion with flanges extending outwardly from the upper edges thereof and having spaced openings therein, panel sections adapted to be positioned in extension of the side walls of the body portion including tubular members formed along the ends of each panel section with the tubular member of one end of a panel section being dimensioned to have an opening larger than the tubular member on the other panel section positioned in end to end relation therewith whereby, in the assembled relation, the tubular member of smaller dimension telescopes into the larger, at least one of said joined tubular sections extending below the lower edge of the panel section and being inserted through the opening to mount the panel sections upright on the wagon body when in the assembled relation.

References Cited in the file of this patent

UNITED STATES PATENTS

| Number | Name | Date |
|---|---|---|
| 567,666 | Tallerday | Sept. 15, 1896 |
| 892,615 | Perry | July 7, 1908 |
| 1,170,691 | Skipworth | Feb. 8, 1916 |
| 2,011,965 | Ball | Aug. 20, 1935 |